US008266632B2

United States Patent
Armangil

(10) Patent No.: US 8,266,632 B2
(45) Date of Patent: Sep. 11, 2012

(54) METHOD AND A SYSTEM FOR THE COMPOSITION OF SERVICES

(76) Inventor: Doga Armangil, Geneva (CH)

( * ) Notice: Subject to any disclaimer, the term of this patent is extended or adjusted under 35 U.S.C. 154(b) by 1153 days.

(21) Appl. No.: 12/121,981

(22) Filed: May 16, 2008

(65) Prior Publication Data

US 2008/0288624 A1 Nov. 20, 2008

(30) Foreign Application Priority Data

May 16, 2007 (EP) .................... 07108389

(51) Int. Cl.
*G06F 3/00* (2006.01)
*G06F 9/44* (2006.01)
*G06F 9/46* (2006.01)
*G06F 13/00* (2006.01)
*G06F 15/16* (2006.01)
*G06F 15/167* (2006.01)
*G06F 15/177* (2006.01)
*G60F 15/173* (2006.01)

(52) U.S. Cl. ........ 719/313; 719/330; 709/202; 709/203; 709/205; 709/218; 709/219; 709/228

(58) Field of Classification Search .................. None
See application file for complete search history.

(56) References Cited

U.S. PATENT DOCUMENTS

| 5,553,242 A | 9/1996 | Russell et al. |
| 5,659,701 A | 8/1997 | Amit et al. |
| 5,926,636 A | 7/1999 | Lam et al. |
| 6,237,024 B1 | 5/2001 | Wollrath et al. |
| 2004/0177335 A1 | 9/2004 | Beisiegel et al. |
| 2004/0205187 A1 | 10/2004 | Sayal et al. |
| 2005/0038871 A1 | 2/2005 | Dean |

FOREIGN PATENT DOCUMENTS

| EP | 1548591 A2 | 6/2005 |
| WO | 2006029645 A1 | 3/2006 |

OTHER PUBLICATIONS

William Grosso, Java RMI, Jan. 2002, O'Reilly Media, Inc., First Edition, pg. iv, 81, 102.*

* cited by examiner

*Primary Examiner* — Andy Ho
*Assistant Examiner* — Craig Dorais
(74) *Attorney, Agent, or Firm* — Pearne & Gordon LLP

(57) ABSTRACT

Method for multiphase service composition in a distributed computing environment comprising at least one client and at least one server, and involving at least one service, which defines a specific format for composition messages associated with multiphase remote procedure calls. This format is different from the one of regular server messages. Once such a composition message is received by the client, it recognizes this specific format and can automatically invoke at least one service on any server by sending a new request message including the arguments passed in this composition message.

16 Claims, 9 Drawing Sheets

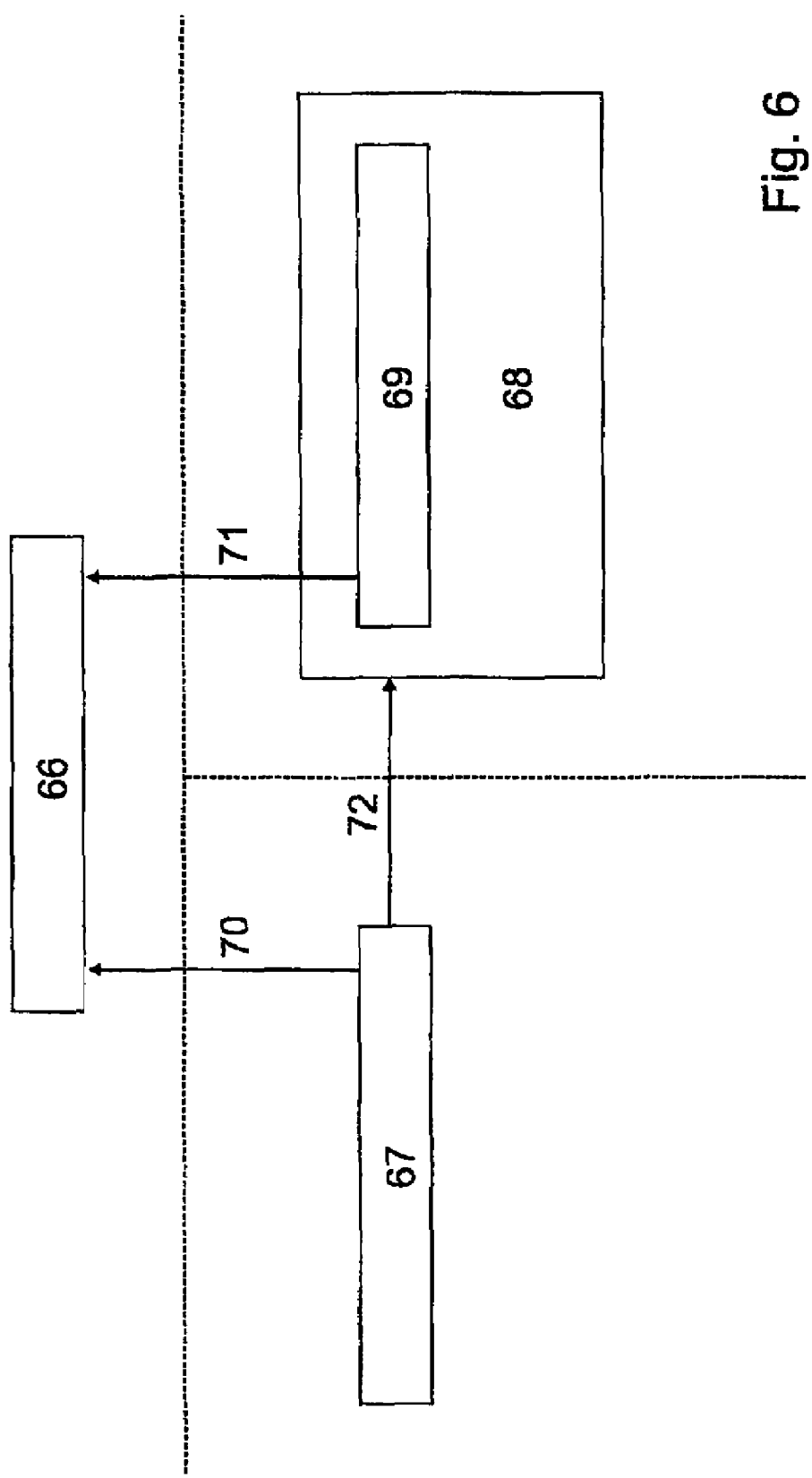

METHOD AND A SYSTEM FOR THE COMPOSITION OF SERVICES

REFERENCE DATA

The present application claims priority from European patent application 2007EP-108389 filed May 16, 2007, the contents whereof are hereby incorporated.

FIELD OF THE INVENTION

The present invention relates to the field of distributed computing and remote procedure calls. It concerns a system and a method for the composition of services in a distributed computing environment.

DESCRIPTION OF RELATED ART

Since the early days of computing, methods and systems have been developed for allowing programs to use software functionality available on other computers. The term service refers to such a software functionality provided by a computer, and used by programs on other computers connected on a same network.

The remote procedure calls, also known as RPCs, are a mechanism by which an application residing on one machine requests the services of an application residing on another machine. RPCs are well-known and used extensively in the context of client-server architectures, for example within company local networks, but also in more distributed computing environments. A remote procedure call is usually made up of three steps: a computer program or client first sends a request message to a remote computer through a network; then a procedure is executed on the remote computer using possibly the argument (if any) included in the incoming message, and then the procedure sends a response back to the client, whereby the message contains the result of the execution.

Complex tasks may however involve a plurality of sequences of the above mentioned steps. In so-called distributed computing environments (DCEs), the processing of such complex tasks can be shared amongst physical machines of a network or virtual machines hosted on a same computer. Services may call other services in order to avoid duplicating functionality that is already implemented by those other services. In such a case where a service calls one or many other services, this service is said to be composed of the called services.

In this context, an increased communication between processes has been required and increasingly computer programs involved the notions of multi-tasking, multi-threads and multiple RPCs.

US20050038871 describes for example an inter-process mechanism where a RPC process calls different functions whose results are gathered and made accessible through a standard URL.

U.S. Pat. No. 6,237,024 describes a remote method manager meant for the suspension and the continuation of remote processes maintaining an internal state in the RPC for its different threads of execution. As a result, resources are optimized and the response time can be improved.

EP1548591 describes a processing system for accelerated treatment of object oriented applications. This processing system involves a central hardware engine for redirecting request messages to the suitable processing resources and a control register for RPCs between client and servers.

The most widely used pattern for the service composition of applications involves direct calls. According to this pattern, a client performs a remote procedure call to a service s1 through a TCP/IP connection or through the use of any connection-oriented protocol like TCP, while s1 in turn calls one or many other services by directly communicating with those services through a connection-oriented protocol such as TCP. A limitation of this direct call pattern is that the risk of connection time-out between the client and s1 increases with each service call that s1 performs, thus decreasing the reliability of the composed service s1. Another aspect of the direct call pattern is that the composed service s1 consumes resources of its host computer in order to maintain and manage the network connections to other services.

To solve this coordination issue related to the communication between services or processes, call stacks have been introduced. Such call stacks store the context of running applications, and manage the unfolding of its different phases of execution, as well as the interaction with the various services involved.

U.S. Pat. No. 5,659,701 describes a call stack distributed on different processors for the execution of a single-thread program having a plurality of callable procedures. Procedures executed in one processor can call procedures on another processor, so that the running of program jumps from one processor to another.

In the context of the client-server model, call stacks implemented as middleware layer on the client side are also known. The introduction of such middleware layers presents the advantage to perform other useful functions such as format conversion, which can be very useful in heterogeneous computing environments, service redirection based on parameters returned etc.

U.S. Pat. No. 5,926,636 describes a RPC middleware for the management of a call stack with embedded methods for managing components in a heterogeneous computer environment by converting client data to a neutral canonical format.

U.S. Pat. No. 5,553,242 discloses a RPC middleware with a mechanism storing operation sequences of different RPC requests in a stack, and a dispatcher responsible to distribute the services to be executed on the server according to its available processing resources.

Another way to solve the interaction problem between services in a distributed environment is disclosed by U.S. Pat. No. 6,832,223, where a look-up service defines a network's directory of services and stores references to those services. This lookup service may be consulted to obtain parameters allowing to invoke other services.

With the advent of the Internet as a universal high bandwidth transport network, the information technology systems have become increasingly distributed, so that data and processing power have been accordingly spread and shared across the web. RPCs made it possible to offload as many tasks as possible on powerful distant servers. However, along with the new possibilities that have emerged in terms of application capabilities, the complexity of software architectures and networks has also raised accordingly. Indeed, inter-machine processing implies not only that processes must be managed and synchronized, but also that systems are interoperable. As a result, an overhead is necessary in terms of programming languages, syntax, protocol stacks used etc. to make sure that machines can interact with each other.

The purpose of DCOM and CORBA was precisely to define a software programming framework based on object-oriented languages, so that objects can be used regardless of the programming language and the operating systems on which the programs are compiled. In parallel, Microsoft and SUN have launched initiatives about interoperable distributed software architecture, with respectively the NET framework and JAVA. Those architectures are not tied to specific technologies, especially development technologies and platforms. They cope mainly with programming and compiling issues but do not deal specifically with RPCs and service composition.

Web Services have been introduced recently by the World Wide Web consortium (W3C) to design a modular software system to support interoperable machine-to-machine interaction over a network. Web Services tools deal more specifically with RPCs, because the interaction between machines requires the mapping of services directly to language-specific functions. XML-RPC, followed by the Simple Object Access Protocol (SOAP) have been precisely developed as a foundation layer of the Web Services stack to address scalability and flexibility issues related to the translation between request messages and functions to be executed in a heterogeneous distributed environment. XML-RPC and the SOAP protocol provide a basic messaging framework containing an embedded RPC pattern, and it defines an extensible message envelope format with bindings to underlying protocols like HTTP or SMTP.

The introduction of a new middleware, such as the SOAP protocol in the context of Web Services RPCs for the translation between the transport protocol and the programming language specific functions or methods of an application, hints at the inherent complexity of multiple distributed RPCs, whose performances can be affected by the encoding format of the messages. Yet there is no indication within the Web Services framework either on how to improve the service composition and the workflow of distributed applications involving calls to complex services. In this perspective, several approaches are used in order to avoid service composition, instead of devising a composition mechanism that improves on the direct call pattern. Asynchronous messaging and service orchestration are two such approaches. The asynchronous messaging approach involves sending messages to others services without waiting for a response. The service orchestration approach involves simple services that do not call other services; these services are called by orchestration software in order to produce more complex behavior.

There is hence no method disclosed in the prior art teaching how to overcome the limitation due to the timeouts for the execution of complex services involving machines spread over a network. There is indeed a restriction for the execution duration of a service while using the TCP/IP protocol stack, or any connection-oriented protocol like TCP, because the network connection aborts when no response has been received for a predefined period of time. These aborts are intended to preserve the network resilience. As a result, service execution cannot last too long when a transmission protocol is involved, and service developers need to take this restriction into account when composing services.

This aspect can become critical for applications between servers spread over a large network, whereby the service composition and workflow of operations are key to ensure both the reliability of the application and its good performances.

A further restriction imposed by the use of direct calls for performing service composition is the fact that interactive services cannot easily be supported. Interactive services are services that interact with the end-user before returning a result. Support for such services would imply additional infrastructure software integrated into services for transmitting interaction messages between the user and the interacting service. Significant overhead would have to be taken into account in terms of execution duration and computing resources.

BRIEF SUMMARY OF THE INVENTION

An aim of the invention is to solve the above mentioned problems of the prior art.

Another aim of the invention is to provide a new method and a new system for calling or composing services in a distributed environment.

According to the invention, these aims are achieved by means of a method for service composition in a distributed computing environment comprising at least one client 1,2,3, 4,12, and at least one server 5,6 and involving at least one service 13,14,15, which defines a specific format for composition messages associated with multiphase remote procedure calls 23,27. This format is different from the one of regular server response messages. Once such a composition message 23,27 is received by the client 12, it recognizes this specific format and can automatically invoke 56 at least one service on any server by sending a new request message including the arguments passed in this composition message 23,27.

The invention thus introduces a concept of "multiphase remote procedure calls" or "multiphase RPCs", where the service being called may in turn call one or many services (including itself) by mediating the calls through the client. The client communicates with the services through a connection-oriented protocol such as TCP. The term phase denotes a service call that is mediated by the client.

The system and method of the invention has applications in the following domains, where it provides an infrastructure solution: software as a service (a.k.a. SaaS), service-oriented architectures (SOAs), web mashups, web services, enterprise application integration (EAI).

This new service composition mechanism involves services that may call other services during their execution, but may also make recursive calls to themselves. The calls are yet always mediated by the client; therefore, the denomination client-mediated nested calling applies very well to such a concept.

This newly introduced service composition pattern unifies the RPC and the WWW paradigm by enabling interactive services, whereby the services can deliver an execution result and terminate like a regular RPC, interact with a client like a GUI application, or reply with a response message in the new specific format that contains instructions, and possibly arguments, for invoking another service.

In a possible embodiment of the invention, the method provides a possibility to easily interact with the end-user while performing a machine-to-machine service. Such an interaction with the end-user before returning a result provides in essence a network-centric counterpart to interactive desktop software components such as a file chooser which can be called by an application, without requiring however an overhead for transmitting interaction messages, which would make the calling chain longer and have in turn a negative impact on the execution duration.

Another benefit is also to increase the reliability of services in avoiding time-outs. Indeed, with the proposed service composition, the phases associated to each RPC involved in an application are reduced since the client mediates all the calls and hence receives a message from a server each time a call to any service must be carried out. Another obvious advantage of this pattern is to relieve servers from the call frame management and allow servers' processing power to be dedicated to other tasks, and also prevent from computing resources waste while supporting long-running services, since the active waiting phases of server is shortened.

BRIEF DESCRIPTION OF THE DRAWINGS

The invention will be better understood with the aid of the description of an embodiment given by way of example and illustrated by the figures, in which:

FIG. 6 is a collaboration diagram illustrating a brokering mechanism according to one preferred embodiment of the invention;

DETAILED DESCRIPTION AND POSSIBLE EMBODIMENTS OF THE INVENTION

Figure 1:
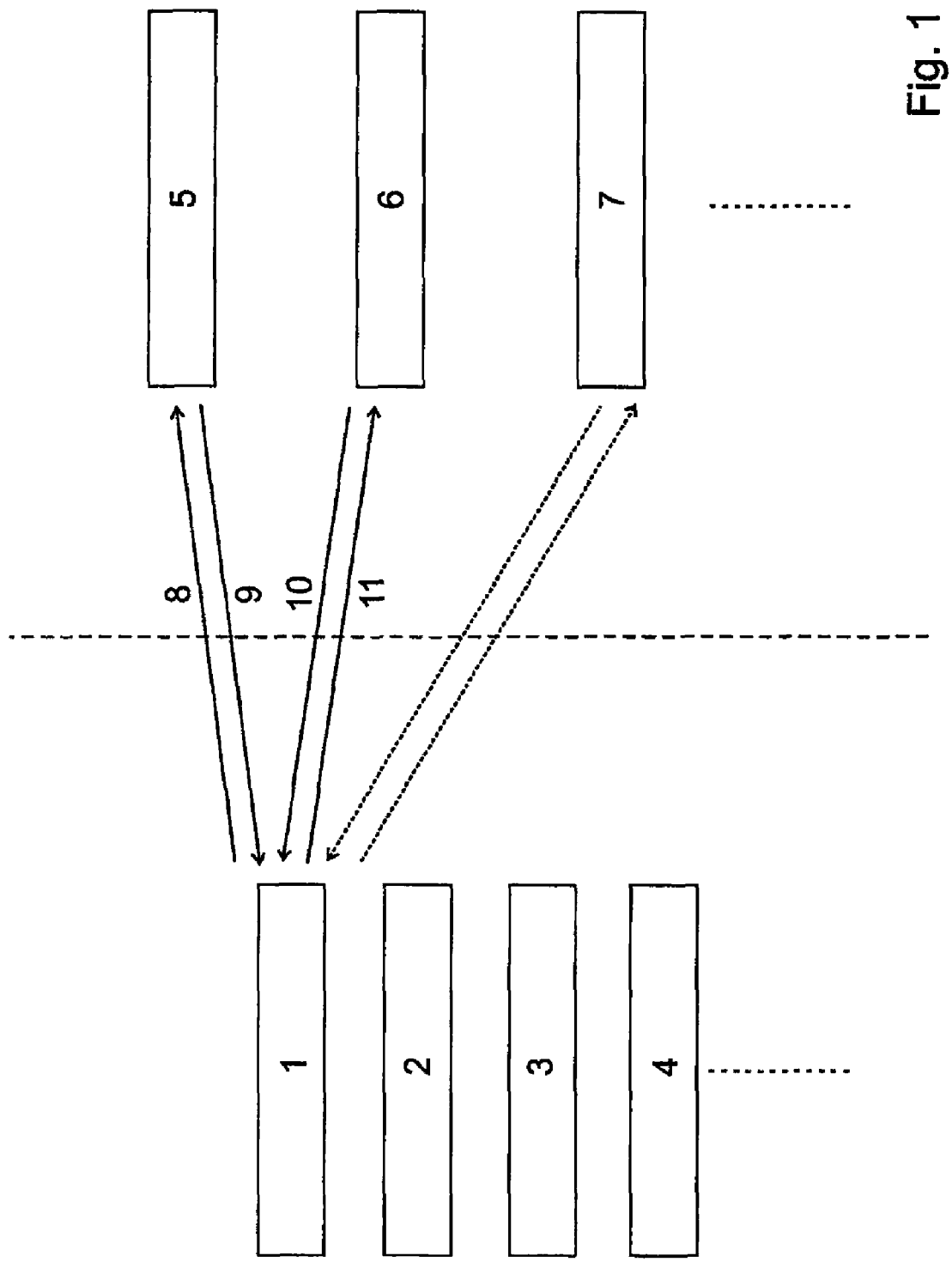
FIG. 1 shows a system with a plurality of servers and a plurality of clients and the workflow of calls and responses exchanged.

A typical system involving a plurality of clients and a plurality of servers is shown in FIG. 1. The term client refers to a hardware and/or software terminal that can take various forms, like e.g. a regular computer or desktop 1, a laptop 2, a PDA 3, a mobile phone 4, etc. When applications—also referred to as client applications—run on this terminal, software functionalities available on other computing systems may be required, because the client terminal does not dispose of the computing resources required to perform such functionalities on its own, for example due to a lack of processing power, memory, or requested data.

The term server refers to a machine providing such software functionality, which is commonly known as a service. Servers are hence usually bigger and more powerful than clients; one can note however, that the distinction between client and server applications does not imply that the services are necessarily executed on different machines, but only that one type of application requests one or more services while the other type of application provides those services.

A typical example to illustrate the client-server paradigm is the Internet, where the IP protocol is used for the transport of packets and the HTTP protocol is used to convey information. A web browser is a typical application that needs the services of web servers during a web browsing session. It asks for the download (arrows 9, 11 on FIG. 1) of web pages that are hosted on such web servers 5, 6, 7 spread over the web and accessible under various URLs. In order to do so, HTTP GET or POST requests 8, 10 are sent by the client, so that the content of requested web pages can be retrieved from the server and delivered as output to the end-users. This type of request is by far the most common and intensively used method on the web today. The workflow pattern of the messages exchanged between the client running the browsing application (here the desktop) and the servers would be the same for every client and depends only on the websites that are visited during a browsing session. Yet this simple example of a web-based service does not involve complex RPC patterns or composed services, i.e. services requiring the services of other services.

Figure 2:
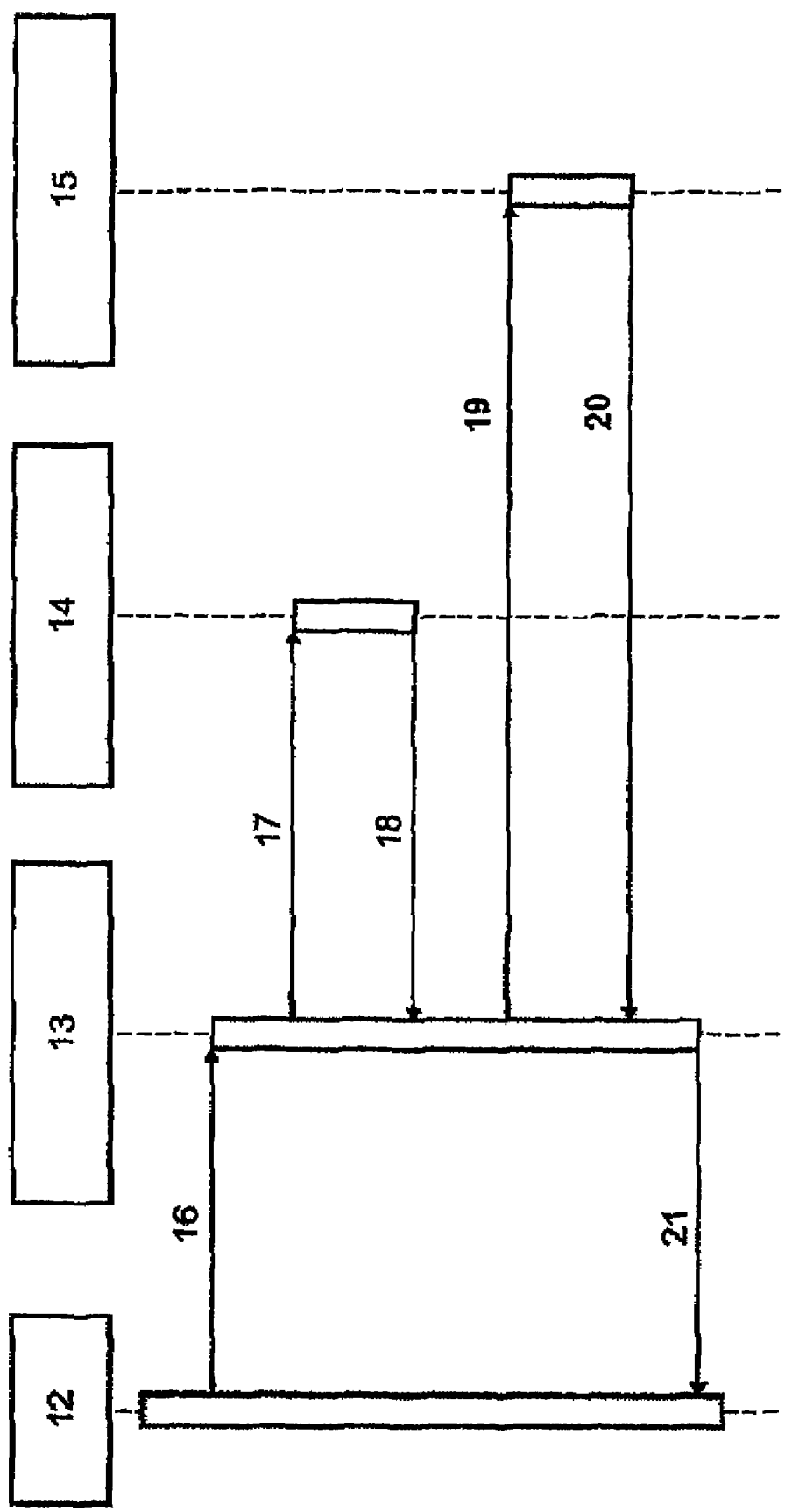
FIG. 2 shows a typical workflow of direct calls according to the prior art.

In order to perform composed call actions between services, whereby the services may or may not be located on the same server, a direct call pattern known from the prior art is illustrated in FIG. 2. A client software 12 sends a request message for invoking a first service s1 13, as indicated by the arrow 16. This service s1 13 can be provided for example by a first server within a network, or by a plurality of distributed servers. In case of a simple RPC, an execution result (for example a web page) would directly be returned to the client. However, in this example more than one service is involved. Before the first service s1 13 returns a result, it invokes a second service s2 14 as shown by the arrow 17, either on the same server or on another server, which will return an execution result (for example a web frame, data, etc) to this service s1 13 as shown with the dotted arrow 18. The first service s1 13 thereafter invokes a third service s3 (arrow 19), which also returns an execution result to this service s1 13 (arrow 20). The service s1 finally returns an execution result of service s1, taking into account the results from s2 13 and s3 14, to the client application 12 (arrow 21). The calls 16,17,19 refer both to the action of invoking a service, whereby each service invoked in this example returns an execution result 18,20,21, and to the time elapsed between the moment a service is invoked and the moment when this delivers an execution result. In case the services are not located on the same machine, a network connection must be established each time a service is called. For web-based services, this means the establishment of a new IP connection; however other transport protocols could be used, e.g. when the clients and servers used are located on a same company network (a.k.a. intranet).

More complex service composition schemes could be imagined that would involve even more services. Yet this illustration is sufficient to show two following drawbacks of this known direct calling pattern:

on one hand, the time elapsed between the moment when the service s1 is called by the client and the moment when a response is actually returned by this service can rapidly increase if the service s1 13 must call many different services before returning an execution result. The total time elapsed between those two moments would correspond to the sum of all the phases of execution of the different services involved. Hence the limitation due to the timeouts when using the TCP/IP protocol stack or any connection-oriented protocol such as TCP is rapidly a strong barrier for service developers, because the network connections between the client and the servers hosting services is very likely to time out when service execution lasts for too long;

on the other hand, a server hosting a service s1 13 that calls a service s2 14 must actively wait for this service to return a result, and monitor the state of execution of this service. Servers with a high level of workload cannot easily afford such a processing power resource waste; furthermore, this direct call pattern does not teach how to easily provision machine-to-machine services.

Figure 3:
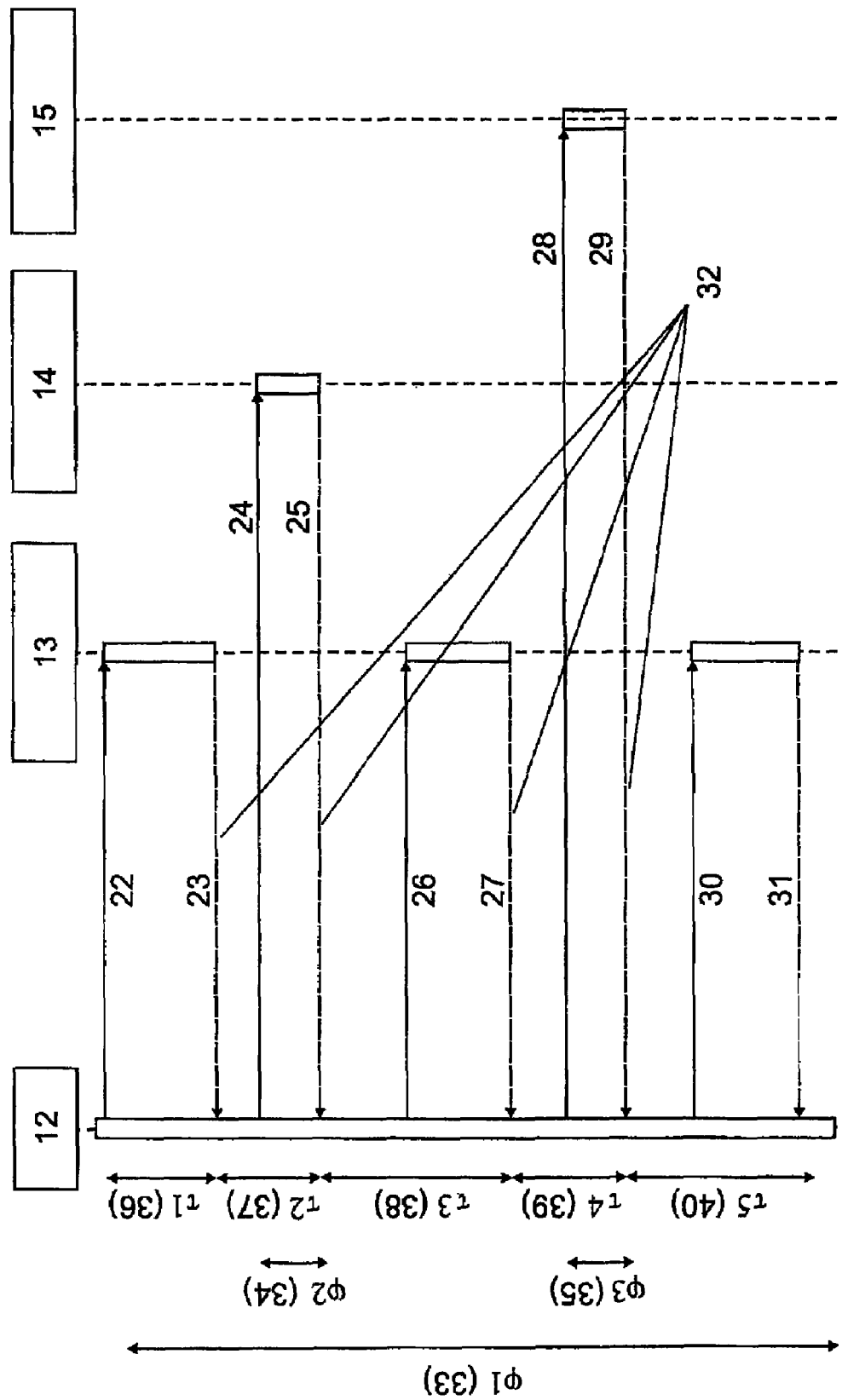
FIG. 3 shows how the calls are mediated by the client in a service composition mechanism according to the invention.

FIG. 3 shows how the new service composition mechanism according to the invention allows to solve those issues, based on the same example as for FIG. 2. Instead of performing direct calls between services (a.k.a. nested calls) when such calls are needed, the disclosed mechanism mediates all the calls from the client. Each time a service, e.g. the service s1 13 in this example, requests other services, e.g. the services s2 14 and s3 15, the calling service s1 13 returns first a message to the client (arrows 23, 27) containing instructions on how to continue the execution of the application, thereby starting another phase of the execution of the application (arrows 22,24,28). Each phase is associated with the execution of a service. Phase 33, also referenced by φ1, corresponds to the execution of s1 13; phase 34, also referenced by φ2 corresponds to the execution of s2 14, and phase 35 also referenced by φ3 corresponds to the execution of s3 15. As a result, the called services are always called by the client on behalf of a calling service, instead of being called by the calling service directly. In the illustrated example, the first message returned to the client 23 is sent by the service s1 13, and it contains an instruction to call the service s2, and possibly arguments for this call (such as an address, input data, etc). This call is performed during the next step of execution 24, where the service s2 14 is invoked. When the client 12 receives the execution result 25 from the called service s2 14, it sends this results back to the calling service s1 13 in the step 26.

The present invention introduces a new calling pattern which allows to overcome the drawbacks of the direct call pattern when composing services. In a preferred embodiment of the invention, this mechanism is applied to web-based services, although the scope of the invention should not be considered as restricted to this domain of application.

Based on the example illustrated by FIG. 3, it can be seen that the server response messages 32 can either contain a service composition instruction or an execution result. In the example, the second message received by the client contains indeed an execution result from service s2 (arrow 25), as opposed to the service composition instruction that is returned by the service s1 13 (arrow 23). Further in the execution, similarly a composition instruction is sent from service s1 to the client for calling the service s3 (arrow 27), whereas once the service s3 has returned a result (arrow 29), call requests from the service s1 will resume (arrow 30) and the final result is delivered to the client (arrow 31). The services involved can span several computers or servers.

The term execution result refers to a server message 32 that contains the results returned by a service at the end of a multiphase remote procedure call. The present invention introduces the concept of composition message. A composition message is a server message 32 that contains zero, one or many call instructions. Each call instruction indicates a multiphase remote procedure call that is to be performed by the client on behalf of the service sending the composition message. A call instruction may include call arguments to be sent to the called service. The composition message also specifies how the service will receive the results of the calls after they are performed by the client.

This service composition introduces the notion of multiphase for the RPCs involved in the execution of an application, because each phase 33,34,35, also referenced by φ1,φ2, φ3 corresponds to the execution of a corresponding service respectively s1 13, s2 14, and s3 15. According to this multiphase service composition pattern, the client 12 mediates all the call requests and waits for messages to be returned. Those messages will either contain the execution result for this service, thereby closing the phase corresponding to this service as in steps 26,30 or an instruction to invoke another service as in steps 23,27 followed by the call steps 24,28 of invoking services s2 14 and s3 15 respectively. Either way, another phase is started each time a service is invoked, and accordingly, a message is received by the client as in steps 23,27.

With this service composition mechanism, the time elapsed between the moment when the client sends a request to a server in invoking a service and the moment when it receives a first message back, and more generally the time interval between the messages received by the client is significantly shortened. The references 36,37,38,39,40 correspond to those time intervals τ1,τ2,τ3,τ4,τ5, whereby the time interval τ1 36 corresponds to the time elapsed between the first call step and the first message received, and all the other time intervals τ2 37,τ3 38,τ4 39,τ5 40 correspond to time intervals between messages received by the client 12. The comparison between FIG. 3 and FIG. 2 clearly points out the advantage of receiving a first message after a time interval τ1 36 instead of needing to wait for the full execution of service s1 13, which means to wait for a time φ1 33 equal to the sum of all time intervals τ1+τ2+τ3+τ4+τ5. The issue of the connection timeout is hence overcome, e.g. in case where a connection-oriented protocol such as TCP is used for the communication between servers hosting services and clients using those services. Another benefit of such a mechanism is the possibility to manage the different calls on the client and relieve the servers of such a task, especially when nested calls are involved. As a result, no processing power of servers as wasted for the active waiting of results and the servers are relieved from the multiple RPC call management. Furthermore, this mechanism allows to easily interact with an end-user each time a message is returned to the client. In a preferred embodiment of the invention involving web-based applications, and where the servers can thus send any type of content back such as HMTL pages, the client 12 knows that a service is interactive every time it receives a web page (HTML or other) from this service. Human users can then take part to the execution of nested services by specifying the result they return to the caller services and this way influence the execution steps. An example of preferred web-based applications applied to the mechanism according to the invention is described further in this document.

The service composition mechanism according to the invention involves a specific format for the composition messages returned by servers that is different from regular response messages sent when no multiphase, composed service invocation is requested. This format, described further in this document according to a preferred embodiment of the invention, is the cornerstone of the client-mediated nested service composition disclosed, because it allows the client 12 to recognize that an instruction to invoke a new service is included in the answer. The client 12 can thus automatically invoke this service on the same or on other servers 5,6,7 by sending a new request message that may also include arguments included in the response message 32. This way, the unfolding of an application with multiple RPCs is performed on the client's side and the calls between services are always done by the client 12 on behalf of the services.

The fact that the mediation of multiphase RPC request messages is performed by the client also allows for interactivity with the end-user. On one hand, the end-user can receive audio and/or visual signals already generated at the end of a phase, before the last response message from the last invoked service has been received. This output may be delivered for example as HTML web-page in the context of web-based services. Between successive phases, or during phases, the end-user may also input arguments that are included in request messages sent to at least one further invoked service, e.g. in HTTP POST requests.

A given application may be interactive during one phase, but not however during the next. Furthermore, this interaction is oblivious to the services composing an application. The specific format used in server response messages indeed only allows a caller service hosted on a server to convey service composition instructions by sending request messages to the client, but not to determine whether one of the called services will interact with the user. An example to illustrate a kind of possible interaction is described further in this document.

The specific format for server composition messages can consist in flags embedded in messages, whereby each flag would indicate an action to take, like continue the execution on another machine, invoke another service indicated by the flag etc. Stacked information could also be considered, containing a first indication e.g. on where to invoke the service and a second indication on which service to invoke.

Figure 4:
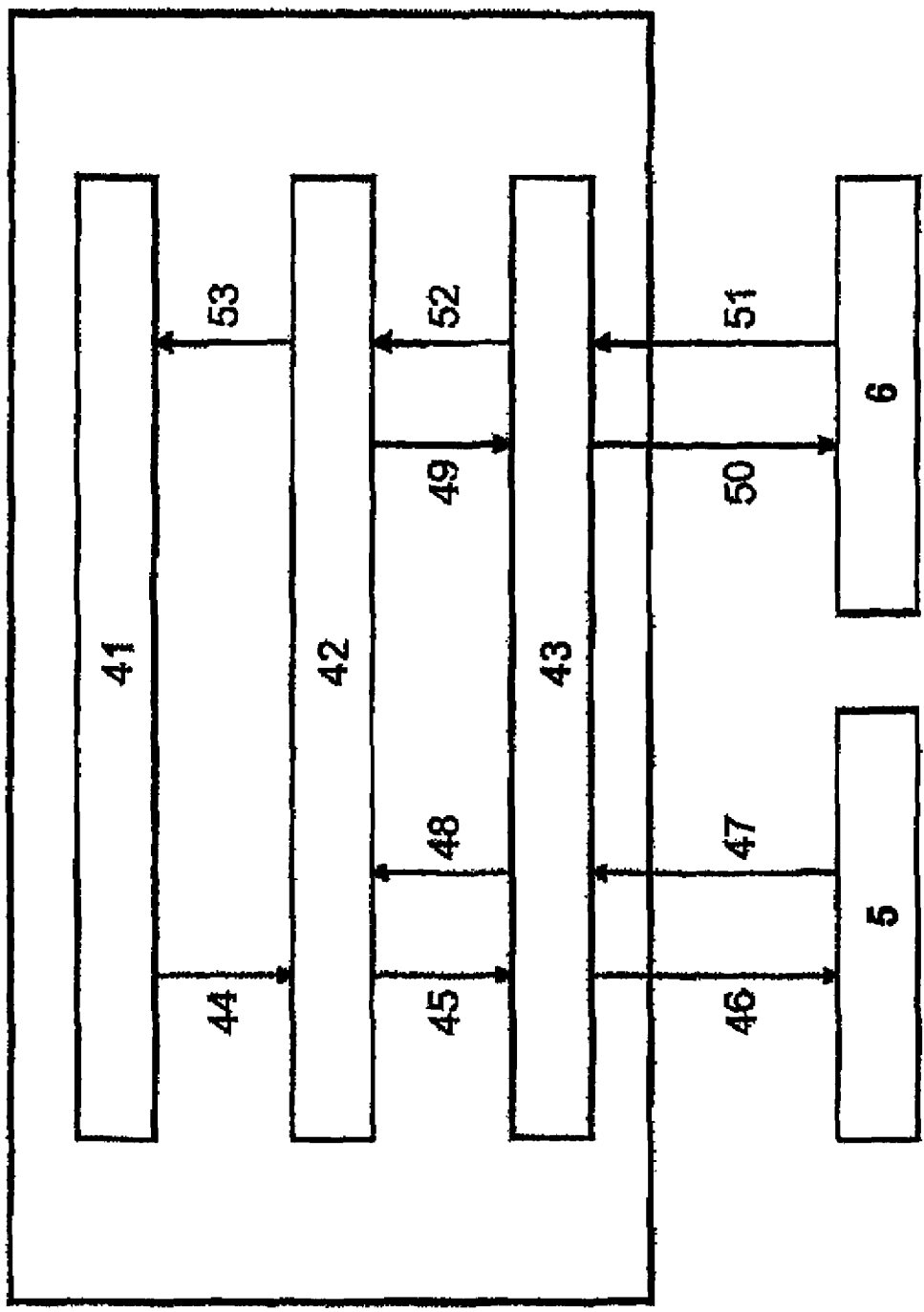
FIG. 4 is a diagram illustrating the different logical layers in the client apparatus, including the new middleware layer according to a preferred embodiment of the invention.

According to a preferred embodiment of the invention, the specific format for composition messages from a server is defined by a new middleware layer 42 between the application layer 41 and the RPC layer 43, as illustrated in FIG. 4 showing the workflow of an RPC application running on two servers 5,6. Such a multiphase RPC middleware layer 42 makes up an additional abstraction layer that takes over the treatment of the messages returned by the servers 32 of FIG. 3. The abstraction layer corresponds to a new programming protocol stack, and thus should not be interpreted as a new protocol stack in the sense of the OSI model. In a preferred embodiment of the invention dealing with web-based services, this layer is characterized by a new MIME type meant to be used with HTTP as an underlying protocol. The MIME type consists of a special tag allowing to distinguish the messages exchanged in the frame of a multiphase RPC from other messages. In this case, the multi-phase RPC layer will rely on the HTTP request methods available for the transmission of the calls, i.e. all the services will be invoked through HTTP request messages. In FIG. 4, the steps between the RPC layer 43 and the servers 5,6 occur as in regular RPCs through the steps of sending RPC arguments 46,50 and receiving execution results 47,51. A first the difference with the regular RPC pattern concerns the step 44 where a sub-call between the application layer and the multi-phase RPC is carried out. The intervention of the multi-phase RPC layer 42 allows to transmit the RPC arguments to the server 5,6 with the new defined application type. Once the results are returned to the RPC layer (step 47), step 48 do not return the results of the RPC up to the application layer, but passes the result onto the multiphase RPC stack 42 under this new format. In a preferred embodiment dealing with web-based services, the middleware on the client's side is a content handler like a web-browser extension or plug-in preferably downloadable over the Internet, which precisely allows to recognize and process the server messages on the client. It can automatically invoke a new service 49 on server 6 without involving the application layer 40. It is also possible that, based on the arguments passed in the message from the RPC layer to the multiphase RPC layer, the application returns a final result 53 and terminates.

Figure 5A:
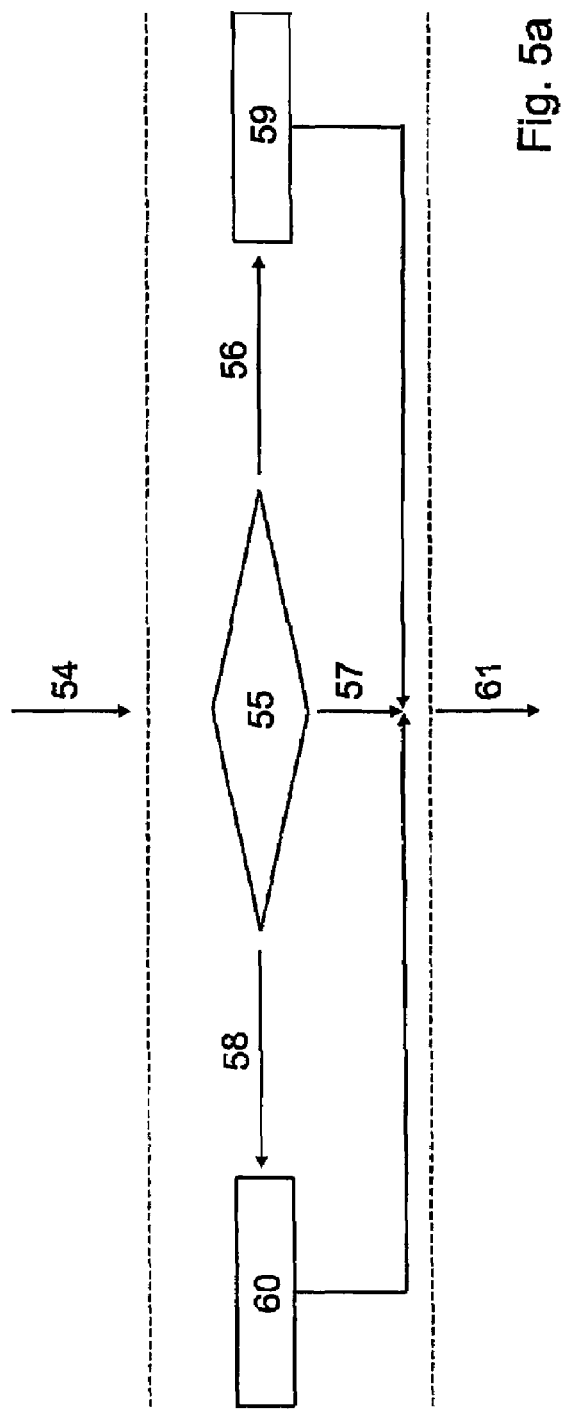
FIG. 5a is an activity diagram illustrating the operations associated with the multiple phase RPC stack management on the client's side.
Figure 5B:
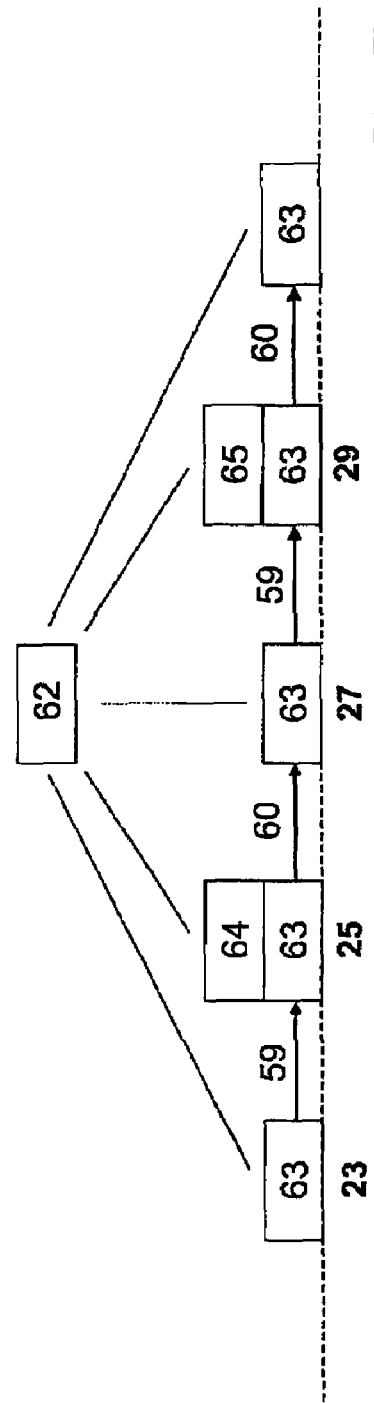
FIG. 5b shows the state of the call stack according to the workflow illustrated in FIG. 3.

This middleware protocol layer 42 also allows to maintain an internal state for each call currently executed in order to know which service has been invoked and whose phase of execution has not resumed yet. Each phase, like e.g. the phases $\phi 1, \phi, \phi 3$ of FIG. 3, can be associated to the duration of a corresponding service call 33,34,35. For nested applications, some phases are resumed or begun while other are already running, so that the information about the phases can be materialized by a stack. FIG. 5a and FIG. 5b describe jointly how this stack works and is managed.

FIG. 5a is an activity diagram of the operation performed by the client 12 to generate a new request message (step 61) when it receives (step 54) a server message 32, that can be a composition message or an execution result, and shows how the client 12 uses its internal call stack 62 to do so. Step 55 allows to recognize the specific format of the composition messages. The client 12 determines whether the received message 32 is a composition message containing call instructions to invoke at least one service (arrow 56), a composition message that does not contain any call instructions (arrow 57), or an execution result (arrow 58).

In case of a composition message containing call instructions to invoke at least one service (arrow 56), the step 59 is performed. In this step, first the composition message is stored in the topmost call frame of the call stack. Then the client chooses one of the call instructions specified in the message; this call will immediately be initiated by the client. Next, the client pushes a new call frame onto the call stack; this frame represents the call which will be initiated. Finally, the client generates the request message (arrow 61) that will be sent to a server to initiate the call. If the call instruction specifies any call arguments, then the client includes them in the request message.

In case of a composition message that does not contain any call instructions (arrow 57), the current call represented by the topmost call frame will continue by sending a new request message. The client simply generates the new request message as specified by the composition message, without modifying the call stack. If the composition message specifies any arguments, then the client includes them in the request message.

Finally, in case of an execution result (arrow 58), the client performs the step 60 which terminates the execution of the current call. In this step, first the topmost call frame is removed from the call stack. If there is no call frame left in the call stack, then the main call has terminated, and the step 60 ends without producing a request message (arrow 61). If, on the other hand, there is at least one call frame left in the call stack, then a request message (arrow 61) can be produced based on the composition message stored in the topmost call frame. In this case, the execution result and a pointer to the corresponding call instruction in the composition message are stored in the topmost call frame. Next, the client chooses another call instruction in the composition message that has not been performed yet. If there is such an instruction, then the client pushes a new call frame onto the call stack and generates a corresponding request message 61. This message includes any arguments that the call instruction may specify. If, on the other hand, there is no such instruction, then the composition message is entirely resolved, and the service which issued said composition message is to receive a new request message containing the execution results, possibly on another server than the server that sent said composition message. The client generates the request message 61 based on the composition message, the execution results and the pointers relating the call instructions and the execution results.

FIG. 5b is the illustration of the evolution of the call stack 62 at different moments of the execution of the application according to the FIG. 3, when server messages are received (steps 23,25,27,29). This stack 62 is made up of a pile of call frames 63,64,65 corresponding to an indication of the execution of the calling phase $\phi 1, \phi 2, \phi 3$, whereby the top frame is the calling phase currently executed as in 33,34,35 of FIG. 3. This diagram shows the steps 59 and 60 of either adding a call frame 64,65 or removing this call frame based on the content included in the server messages. A service composition instruction as in 23,27 of FIG. 3 leads to step 59 of pushing a new call frame whereas an execution result as in 25,29 leads to step 60 of removing the top call frame.

A preferred embodiment of the invention deals with web-based services, and with servers associated to websites providing interactive services that seamlessly integrate into other websites managed by other servers. According to a possible embodiment of the invention, a server can provide an interactive address book service to webmail sites, so that users do not have to manage and keep synchronized the address books corresponding to each webmail site, as described in FIG. 6.

The client involved can be any type of terminal (PDA, phone, laptop . . . ), as long as a suitable plug-in 69 provided by a service broker 66 can be installed as an extension to the web-browser 68 supplied by the client. This plug-in can for example be downloaded for free (arrow 71) from a website of the service broker 66. This extension will allow any webmail site to use an address book provided by a third party, namely the address book site. In a preferred embodiment, the address book service provider 6 will subscribe (arrow 70) its domain, or part of its domain, to the service broker 66 on the same URL as the one from which the plug-in 68 can be downloaded. This will allow the service provider to use (arrow 72) the web browser extension 69 installed on the browser 68 of webmail users. The dotted lines are meant to separate the areas associated respectively to the service broker 66, the service provider 67, and the end-user using the web-browser 68.

Figure 7:
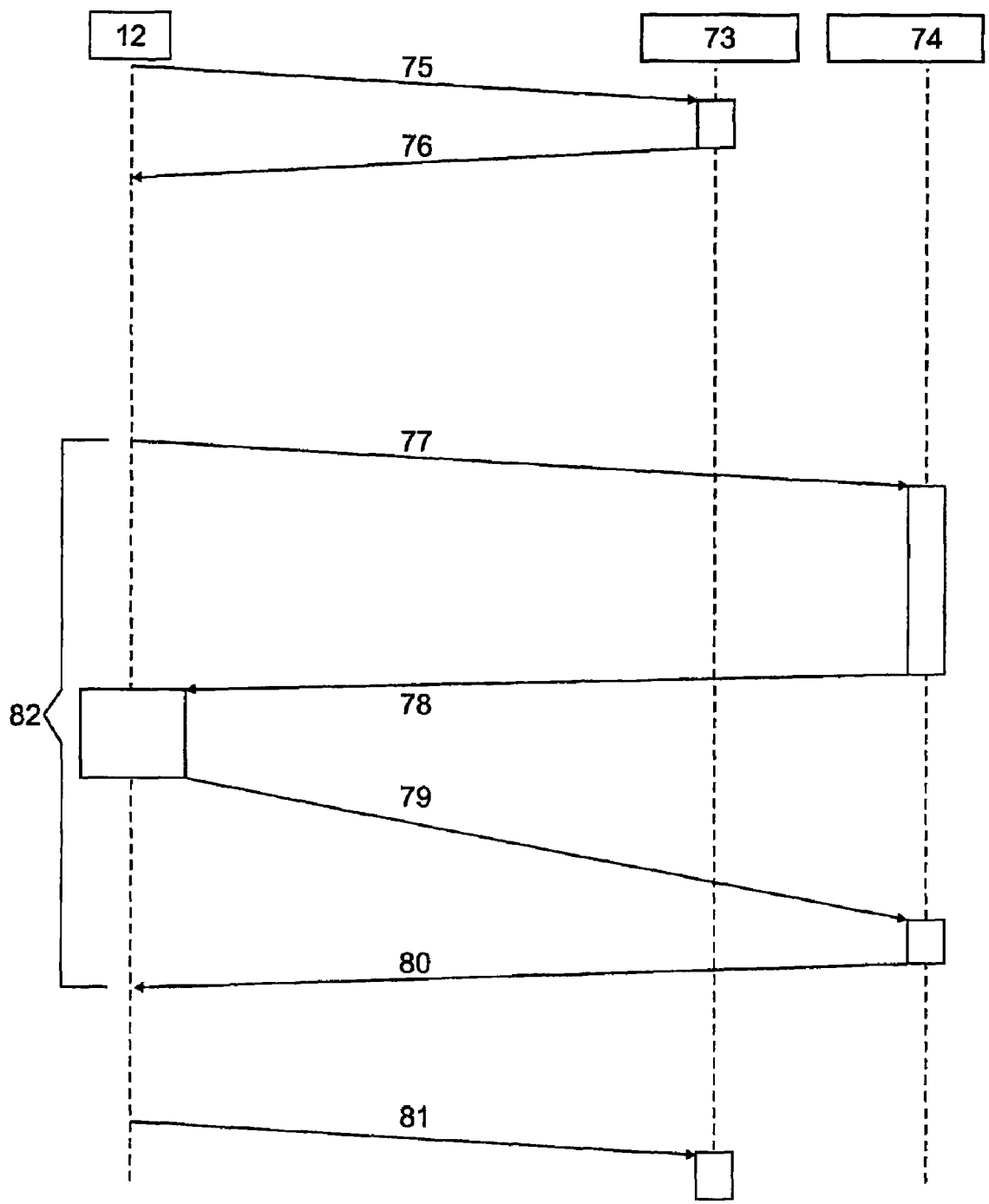
FIG. 7 shows an example of the workflow in a webmail service according to a preferred embodiment of the invention.

FIG. 7 describes in detail the unfolding of an application with a client-mediated call feature according to the invention. When the user of a given webmail site wants to add a contact to its address book (step 75), a server of the webmail site 73 must call the service "add contact" available on a server of the address book site 74. In this example, the webmail site and the server 73 can be accessed through the URL http://www.webmail.com and the address book site server 74 is accessed under the address http://www.addressbook.com. In order to perform this action, the service composition mechanism according to the invention sends a composition message with a specific format (step 76) to the client, called Qworum format. As it can be deduced from the type "application/x-qworum+xml", the Qworum middleware is based on XML. This embodiment should not however be considered as restrictive, since other underlying RPC formats (SOAP or others) would also be possible.

This first message contains a service composition instruction, whereby the redirection indicated by the "goto" indicates the bookmark of the webmail site on which the results must be displayed. The URL http://www.qworum.com corresponds in this example to the specific XML namespace used for the definition of the composition message formats and provided by the service broker 66 on FIG. 6. The composition message includes an instruction to invoke the "add contact" service on the URL of the address book service provider. In a preferred embodiment of the service composition where the different phases of a service can span several computers, the first phase is always executed on a determined computer, like here the server 74 hosting the address book for example. In the illustrated example of FIG. 7, the reference 82 corresponds to the phase of execution of the call to the service "add contact".

The client receives the composition message with the specific format and invokes the "add contact" service on behalf of the server of the webmail site 73 (step 77). It generates an HTTP POST request containing the name to be added to the address book "John Doe" as well as its e-mail address john.doe@gmail.com. The server of the address book site 74 then returns a web page to the client (step 78), allowing the end user to confirm the update of the address book (step 79). Although the interactivity is quite limited here, since the end user simply validates an action, this example shows the point of always returning messages to the client—here for the sake of interactivity—instead of letting services communicating directly with each other. Another already mentioned benefit is the reduction of the time between a call initiation and the return of a result.

Once the addition of the contact is validated by the end-user, the client sends an HTTP GET request to the server of the address book site 74 (step 79), that sends the execution result to the client (step 80), which resumes the call to the "add contact" service. The client sends in turn the results to the webmail site (step 81).

Figure 8:
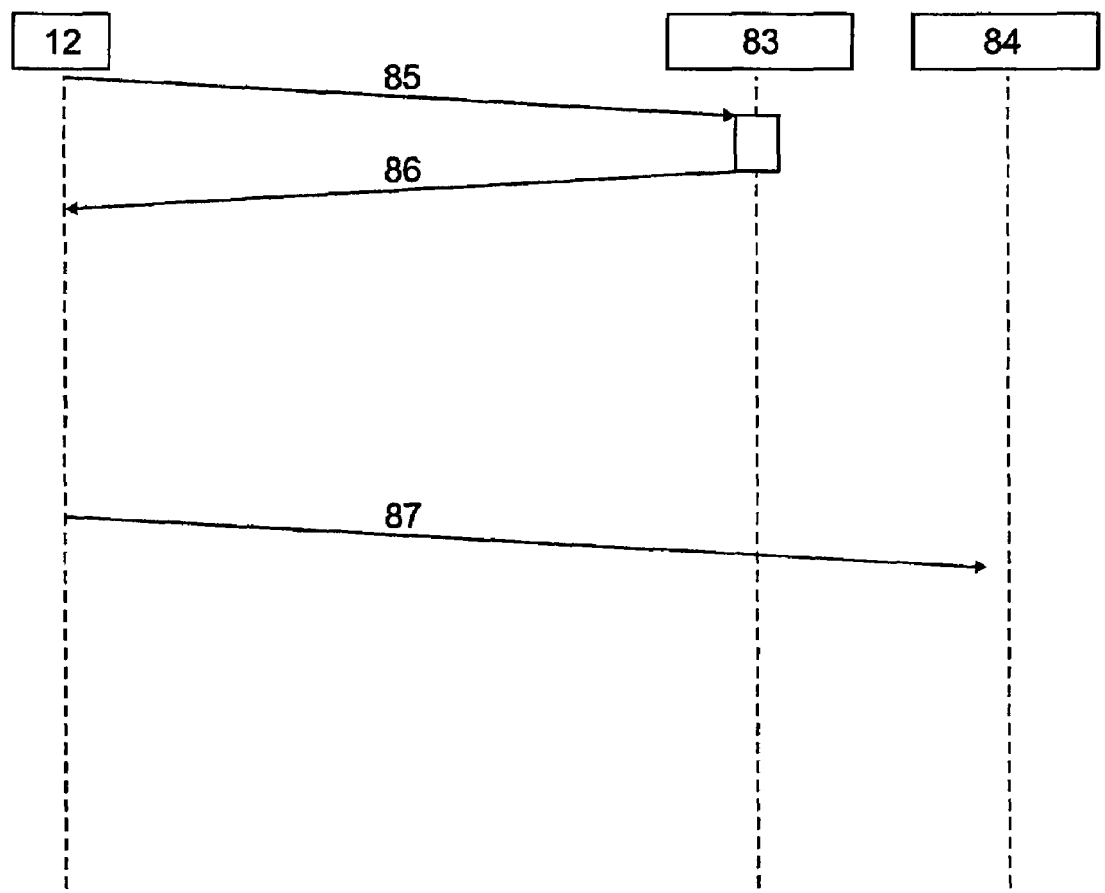
FIG. 8 shows an example of workflow from the continuation of a call on different servers.

FIG. 8. describes the example of the continuation of a call to a service from a server 83 to another server 84 dealing with address books. The principle remains identical: the user of a given webmail site initiates the call forwarding (step 85). An HTTP response containing a composition message in a specific format is sent back to the client 12 (step 86) which redirects the browser towards another URL (here www2.addressbook.com) where the server 84 can be reached without any further invocation of the service (step 87).

Figure 9:
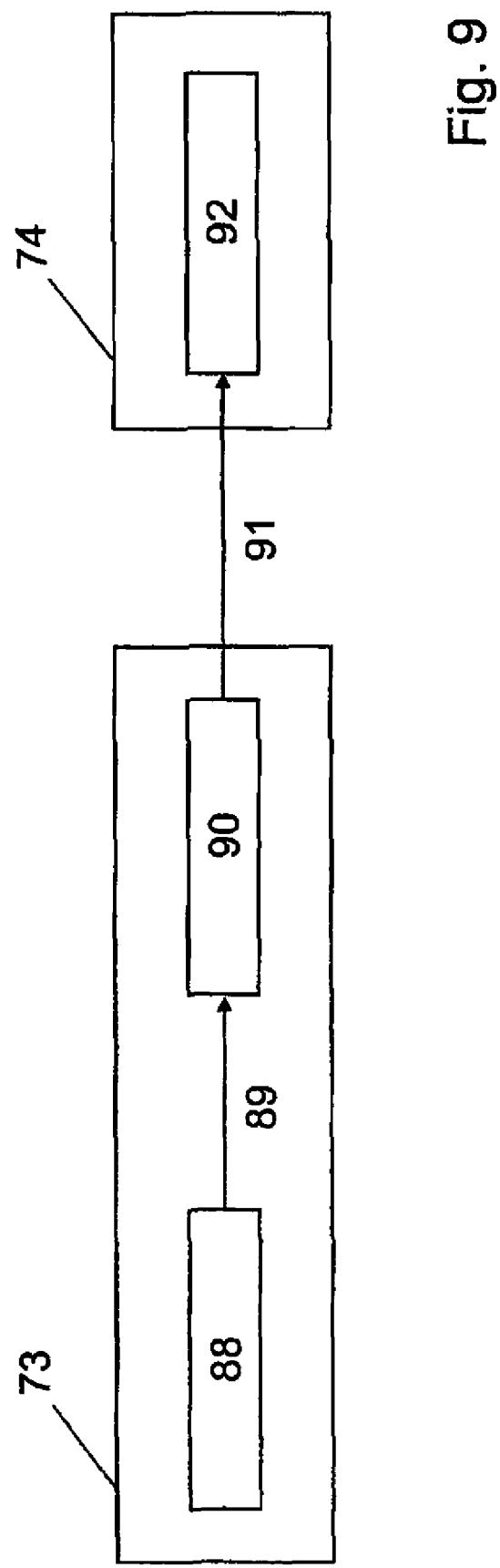
FIG. 9 is a collaboration diagram illustrating how services interact with the end-user in an application.

Many more services may be imagined for the management of an outsourced address book: addresses must be updated, added, removed etc. The example of a service invoked for choosing a contact from an address book is useful to point out how services can be more interactive than in the example previously described, as described in FIG. 9. When a user wants to compose a new e-mail, the webmail application 88 that is actuated by the end user directly through a browser calls a "compose_email" service 90 on the webmail server 73, as shown by arrow 89. When the user wants to choose the recipients of the e-mail, the "compose_email" service 90 in turn calls the choose_contact service 92 from the address book server 74 (step 91). In this case, the end-users participate to the execution of the nested services (compose_email 90, choose_contact 92) by specifying the result returned to the caller service compose_email 90. This way, they influence the execution steps, since the next request messages will depend on the input they have provided. This example also shows that the interaction can occur between an end-user and either a caller service, like in this example, or a called service, like in the example of the "add_contact" service mentioned previously. From a user experience point of view, the nested calls are however not perceived differently than a regular web browsing session.

The brokering of services for websites according to one embodiment of the invention is not confined to webmail services. One could also imagine that an online payment company could provide services to e-commerce sites with the same mechanism: the online payment company subscribes its domain name to a service broker 66, which will allow to use the web browser extension installed on users of e-commerce sites. This way, payment services could be outsourced and brokered to the e-commerce sites, while being interactive with the end-user for which the experience will remain unchanged as in a regular web browsing session.

The brokering of services according to the service composition mechanism disclosed could also allow to integrate services available on various servers of an intranet, whereby a single client application would call for all the services spread over the various servers and take care of the coordination between the services. In this case, this mechanism would serve as tool for Enterprise Application Integration. As seen in the previous examples, the disclosed service composition mechanism is also very suitable for the services outsourcing, since it allows to get rid of the time-out problem. In this case, the client-mediated service brokering mechanism would provide an alternative to service orchestration and support a service oriented architecture (SOA).

Hybrid usage of such a composition mechanism could also serve the purpose of Business Process Outsourcing (BPO) or Service Outsourcing (SO), whereby services available externally or on the Internet would be called by services of the intranet, e.g. over a VPN connection.

List Of References (1) Desktop
(2) Laptop
(3) PDA
(4) Mobile Phone
(5) First server accessible through a first URL
(6) Second server accessible through a second URL
(7) Third server accessible through a third URL
(8) HTTP request message on server 5
(9) HTML page download
(10) HTTP request message on server 6
(11) HTML page download
(12) Client application (software)
(13) Service s1
(14) Service s2
(15) Service s3
(16) Step of calling s1 from the client application
(17) Step of calling s2 from s1
(18) Step of returning the execution result from s2 to s1
(19) Step of calling s3 from s1
(20) Step of returning the execution result from s3 to s1
(21) Step of returning the execution result of s1 to the client application
(22) Step of calling s1 from the client application
(23) Step of sending a first service composition message back to the client
(24) Step of calling s2 from the client application on behalf of s1
(25) Step of returning the execution result from s2 to the client
(26) Step of resuming the execution phase associated with s2
(27) Step of sending a second service composition instruction back to the client
(28) Step of calling s3 from the client application on behalf of s1
(29) Step of returning the execution result from s3 to the client
(30) Step of resuming the execution phase associated with s2
(31) Step of returning the execution result of s1 to the client application
(32) Server message, being a composition message of a specific format or an execution result
(33) Period of time φ1 associated to the execution of s1
(34) Period of time φ2 associated to the execution of s2
(35) Period of time φ3 associated to the execution of s3
(36) Period of time τ1 before the first message received by the client
(37) Period of time τ2 between the first and the second message received by the client (38) Period of time τ3 between the second and the third message received by the client
(39) Period of time τ4 between the third and the fourth message received by the client
(40) Period of time τ5 between the fourth and the fifth message received by the client
(41) Application layer
(42) Multi-phase RPC protocol layer
(43) RPC protocol layer
(44) First sub call from the application layer to the multiphase RPC middleware layer
(45) First sub call from the multiphase RPC middleware layer to the RPC layer
(46) Service request from the RPC layer to a first server
(47) Execution result return from the first server to the RPC layer
(48) Result return from the RPC layer to the multi-phase RPC middleware layer
(49) Second sub call from the multiphase RPC middleware layer to the RPC layer
(50) Second service request from the RPC layer to a second server
(51) Execution result from the second server to the RPC layer
(52) Result return from the RPC layer to the multi-phase RPC middleware layer
(53) Final result return from the multi-phase RPC layer to the application layer
(54) Step of receiving a server message
(55) Step of processing the server message on the client
(56) Case of recognizing a composition message that contains at least one call instruction
(57) Case of a recognizing a composition message that does not contain any call instruction
(58) Case of an execution result recognized
(59) Step of pushing a call frame on the call stack
(60) Step of removing the top-most call frame
(61) Step of sending a request message to a server
(62) Call stack
(63) Call frame associated to phase φ1 (33)
(64) Call frame associated to phase φ2 (34)
(65) Call frame associated to phase φ3 (35)
(66) Service broker
(67) Service provider
(68) Web browser
(69) Web browser extension (plug-in)
(70) Step of subscribing to the service broker
(71) Step of downloading the web-browser plug-in
(72) Usage of the web browsing extension
(73) Server of a web site using an outsourced address book service
(74) Server of a web site providing an outsourced address book service
(75) Step of initiating the addition of a contact in an address book carried out by the end-user
(76) Step of sending a composition message with a specific format
(77) Step of invoking the "add contact" service through an HTTP POST request
(78) Step of returning a web page to the client
(79) Step of validating the addition of the contact
(80) Step of resuming the phase of execution of the "add contact" service
(81) Step of sending the results of the "add contact" service to a server of the webmail site server
(82) Phase associated to the "add contact" service call
(83) First address book service provider
(84) Second address book service provider
(85) Step of initiating the continuation carried out by the end-user
(86) Step of sending a server message with a specific format
(87) Step of redirecting the service to another server
(88) Webmail application
(89) Step of invoking the "compose_email" service
(90) "Compose email" service
(91) Step of invoking the "choose_contact" service
(92) "Choose_contact" service

The invention claimed is:

1. A method for service composition in a distributed computing environment comprising at least one client and a server, and involving at least one service, comprising the steps of
sending a request to said server from said client invoking said service;

said client receives from said server, in response to said receives, a composition message in a specific format, wherein said specific format can be recognized and said format indicates that composition messages carry calls to said service, and wherein composition messages also carry results from said calls;

said client recognizing said specific format when said composition message is received;

said client automatically invoking said at least one service from said client on said server by sending a new request message including arguments included in said composition message;

receiving call results from said at least one service in said client;

sending said call results to any said server from said client; and maintaining in said client a call stack for handling composition massages by including the steps of:

said client storing one of said composition messages in a top-most frame before performing service calls as instructed by said one of said composition messages, said client pushing a frame onto said call stack when initiating one of said service calls;

when said one of said service calls terminates, said client removing the top-most frame by ending a result to said client, and before sending to any said server the said one of said composition messages, said client removing said one of said composition messages from the top-most frame.

2. The method of claim 1, further comprising the initial step of:

sending a request message from said client for calling a first service on a first determined server.

3. The method of claim 1, wherein said new request message includes arguments depending on an input provided by an end user.

4. The method: of claim 1, wherein said composition message with said specific format initiates audio or visual output for an end user.

5. The method of claim 1, whereby said client comprises a content handler for recognizing said specific format in said server messages.

6. The method of claim 5, said content handler being a downloadable plug-in for a web browser.

7. The method of claim 1 whereby said specific format for composition messages associated to multiphase remote procedure calls includes embedded flags.

8. The method of claim 1, whereby said specific format for composition messages associated to multiphase remote procedure calls is defined by an additional middleware protocol.

9. The method of claim 8, whereby said specific format defines a corresponding specific XML vocabulary used by composition messages.

10. The method of claim 9 whereby http or https is used as transport protocol for said server messages.

11. A method for multiphase service composition in a distributed computing environment comprising at least one client land at least one server, comprising following steps:

receiving a request on said server from said client;

sending from said, server a composition message in a specific format to said client, whereby said composition message contains an instruction for said client to invoke a service and to send to, any said server a result of said invocation;

receiving on any said server the result of said invocation; and maintaining in said client a call stack for handling composition messages by including the steps of:

said client storing one of said composition messages in a top-most frame before performing service calls as instructed by said one of said composition messages, said client pushing a frame onto said call stack when initiating one of said service calls;

when said one of said service calls terminates, said client removing the top-most frame by sending a result to said client, and before sending to any said server the results of one of said service calls as instructed by said one composition messages, said client removing said one of said composition messages from the top-most frame.

12. The method of claim 11 said composition message including arguments for the invoked service.

13. The method of claim 11 whereby said specific format defines a corresponding specific XML vocabulary used by composition messages.

14. System comprising at least one client and at least one server performing the method for multiphase remote procedure calls according to claim 9.

15. A carrier for storing a computer program to be executed by a computer system so as to perform the steps of one of the method of claim 1 when said program is executed.

16. A method for service composition in a distributed computing environment comprising a client requesting a service and a server invoking said service, said method comprising the steps of:

providing a composition message in a specific format, wherein said format indicates that composition messages carry calls to any additional service invoked by said request back to said client;

sending a request to said server from said client invoking said service;

said client receiving from said server, in response to said request, a composition message in said specific format, wherein in response to receiving said composition message, said client recognizing said specific format and, in response to said recognizing:

said client sending a new request message including any said call to the additional service present in said composition message to said server or an additional server for invoking said additional service, wherein the arguments in said composition message that were obtained from invoking said service are also forwarded to said server or said additional server for invoking said additional service; and maintaining in said client call stack for handling composition messages by including the steps of:

said client storing one of said composition messages in a top-most frame before performing service calls as instructed by said one of said composition messages;

said client pushing a frame onto said call stack when initiating one of said service calls;

when said one of said service calls terminates, said client removing the top-most frame by sending a result to said client, and before sending to any said server the results of said one of said service calls as instructed by said one of said composition messages, said client removing said one of said composition file messages from the top-most frame.

* * * * *